United States Patent [19]

Furusho

[11] Patent Number: 4,602,999
[45] Date of Patent: Jul. 29, 1986

[54] METHOD FOR REMOVING A SILICIC COMPOUND FROM THE WASTE LIQUOR OF STEEL PICKLING

[75] Inventor: Genji Furusho, Tokyo, Japan

[73] Assignee: Chemirite, Tokyo, Japan

[21] Appl. No.: 629,337

[22] Filed: Jul. 10, 1984

[30] Foreign Application Priority Data

Nov. 8, 1983 [JP] Japan .................................. 58-208229
Nov. 8, 1983 [JP] Japan .................................. 58-208230

[51] Int. Cl.$^4$ ........................................... B01D 15/00
[52] U.S. Cl. ..................................... 210/669; 210/660; 210/673
[58] Field of Search ................ 210/660, 669, 673, 683

[56] References Cited

U.S. PATENT DOCUMENTS

| | | | |
|---|---|---|---|
| 2,503,769 | 4/1950 | Roberts | 210/683 |
| 2,504,695 | 4/1950 | Jukkola et al. | 210/683 |
| 4,098,691 | 7/1978 | Filby | 210/683 |
| 4,125,594 | 11/1978 | Su et al. | 210/683 |
| 4,276,180 | 6/1981 | Matson | 210/683 |

FOREIGN PATENT DOCUMENTS 58-151335 9/1983 Japan .

OTHER PUBLICATIONS

R. K. Sley "Colloid Chemistry of Sillica & Sillicates" (Cornell University Press) 43 1955.
Tarutani "Study of Sillicic Acid in Water" Journal of the Chemical Society of Japan, vol. 77, p. 1721, (1956).

Primary Examiner—Ivars Cintins
Attorney, Agent, or Firm—Kenyon & Kenyon

[57] ABSTRACT

The present invention relates to a method for removing a silicic compound from the waste liquor of steel pickling. A filtering method using a filter fabric or biscuit plate is impractical as an industrial method because the filtering medium becomes clogged.

The present invention is characterized by an adsorption method in which silicic compounds are adsorbed on adsorbent substrates in an optional part of an adsorption bed.

The present invention is characterized in that the waste liquor is passed through the adsorption bed for a two-month period or longer without clogging occurring.

7 Claims, 1 Drawing Figure

METHOD FOR REMOVING A SILICIC COMPOUND FROM THE WASTE LIQUOR OF STEEL PICKLING

BACKGROUND OF THE INVENTION

1. Field of the Invention

The present invention relates to a method for removing a silicic compound from the waste liquor of steel pickling so as to recover therefrom high purity iron oxide powder.

2. Description of the Prior Art

As is well known, the hydrochloric acid pickling process has been mainly employed recently in the steel industry. The waste liquor of the hydrochloric acid pickling process is a ferrous chloride solution which is decomposed thermally into iron oxide and hydrochloric acid. The recovered hydrochloric acid is then used in the pickling process, and the recovered iron oxide is mainly used as the raw material of ferrite products and pigments. The impurities contained in the iron oxide are required to be in a small amount for ferrite production, and, especially in the case of the production of soft ferrite, the content of the silicic compound must be as low as possible.

Since it is difficult to remove the silicic compound from the iron oxide powder itself, a removing treatment must be applied before the decomposition process.

A centrifugation method and a recrystallization method are generally known for removing a silicic compound from the waste liquor of steel pickling. However, they involve fundamental difficulties in operation techniques so they are uneconomical methods.

A filtration method using a filter fabric or biscuit plate is sometimes applied to remove the silicic compound from the waste liquor of steel pickling after coagulation of the silicic compound in the liquor by some coagulation agent. As is well known since in the filtration method the particles are separated from the liquor by means of a filter in order to obtain a filtrate essentially free of particles, a fine filter must be used. The filter used in the filtration method can be embodied as a filter bed, in which the dimension of the through holes of the filter is decreased in the flowing direction of the waste liquor. The filtration method is impractical as an industrial method because the filtering medium becomes clogged after a short time when extremely fine and voluminous particles of the silicic compound are separated.

The prior art includes Japanese Unexamined Patent Publication No. 58-151335.

SUMMARY OF THE INVENTION

It is an object of the present invention to provide a convenient method for removing on an industrial scale a silicic compound contained in the waste liquor of steel pickling. The instruments for removing the silicic compound should be capable of being regenerated easily according to the method of the present invention.

The essence of the present invention resides in a method for removing a silicic compound from the waste liquor of steel pickling, characterized by passing the waste liquor through an adsorption bed filled with adsorbent substrates having a large surface area, by which silicic compounds such as colloidal silicic acid can be effectively removed by adsorption on the substrates. The essence of the present invention also resides in a method for removing a silicic compound from the waste liquor of steel pickling, characterized by regenerating the adsorbent substrates and using them repeatedly.

Several documents have been published with regard to the behavior of a silicic compound in water.

For example, Tarutani reported in a paper entitled "Study of Silicic Acid in Water (Second Report): Formation and Equilibrium Value of Colloidal Silicic Acid" (Journal of the Chemical Society of Japan, Vol 77 (1956), page 1721) that silicic acid can exist in the form of a mono-silicic acid, a poly-silicic acid, or a colloidal silicic acid in an acidic solution and that a mono-silicic acid and a poly-silicic acid are quickly polymerized to yield a colloidal silicic acid in a strongly acidic solution.

In addition, R. K. Iler reported in "The Colliod Chemistry of Silica and Silicates" (Cornell University Press, 1955, page 43) that colloidal silicic acid has such a structure that the siloxane (Si—O—Si) bond extends disorderly in three dimensions and that colloidal silica particles have a very large surface-to-volume ratio.

Based on this information, we believe that, since the waste liquor of steel pickling is strongly acidic, the polymerization of silicic acids into colloidal silicic acid particles takes place and, thus, the largest part of the silicic compound is present in the form of colloidal particles in the waste liquor.

Although the present invention is not restricted by the behavior of the silicic compound in water described above, the removal of the silicic compound by the adsorption according to the present invention is based on the inventors' experience, i.e., that the colloids cannot be effectively removed by filtration but can be effectively removed by adsorption. The method for removing a silicic compound from the waste liquor which results from steel pickling and which contains silicic compound particles is, therefore, characterized in that the waste liquor is passed through an adsorption bed consisting of filled adsorbent substrates so that the silicic compound particles are adsorbed on the adsorbent substrates, and, further, the adsorption is initiated at the top of the adsorption bed and is continued during the waste liquor's passage through the adsorption bed until the waste liquor arrives at an essentially bottom part of the adsorption bed.

According to one aspect of the present invention, the waste liquor of steel pickling is poured into an adsorption bed, which is formed by inorganic or organic adsorbent substrates filled in a cylindrical vessel, and adsorption of the colloidal silicic acid on the adsorbent substrates is initiated at the top of the adsorption bed, the colloidal silicic acid is adsorbed, during the waste liquor's passage through the adsorption bed, in an optional part of the adsorption bed irregardless of the size of the colloid particles, the adsorption is continued until the waste liquor arrives at an essentially bottom portion of the adsorption bed, and substantially all of the colloid particles are removed at the passage of the waste liquor at the bottom of the adsorption bed. It was confirmed that: colloidal silicic acid was first adsorbed on the surface of the adsorbent substrates and was then adsorbed on the adsorbed colloidal layer; the content of the silicic compound as silicon in the waste liquor changed from 10–100 mg/l to 5–6 mg/l after the passing of the waste liquor through the filtering layer adsorption bed; and even after a total adsorption time of two months from the beginning of pouring, the passing speed of the waste liquor continued at an effective rate and the adsorption capability of the adsorbent substrates was maintained.

According to another aspect of the present invention, there is provided a method for removing a silicic compound from waste liquor which results from the pickling of a continuously-annealed steel strip or steel wire and of a batch-annealed steel strip or steel wire, wherein, without clogging occurring for a two-month period or longer, the waste liquor is passed through an adsorption bed and the silicic compound is adsorbed on the adsorbent substrates, the substrates consisting of inorganic or organic moldings, a net plate made of inorganic or organic fiber, or spherical fillers made of inorganic or organic fiber.

According to yet another aspect of the present invention, there is provided a method for removing the silicic compound of steel pickling, wherein the waste liquor containing silicic compound particles is poured into and passed out of a cylindrical vessel, in which adsorbent substrates are filled to form an adsorption bed, the adsorbent substrates having a surface area sufficient to provide adsorption sites on which the silicic compound particles are adsorbed and the passage cross section of the waste liquor through the adsorption bed being sufficient to provide a suitable passing speed of the waste liquor.

The adsorption capability depends on the surface area proportion of the substrates. On the contrary, the passing speed of the waste liquor is inversely proportional to the surface area when the adsorption of the silicic compound is advanced. Thus, the adsorbent substrates should satisfy both of the requirements, i.e., a sufficient adsorption capability and a sufficient passing speed, which requirements are contrary to one another.

When the adsorbent substrates are moldings which have a surface area of 150 m$^2$ or more per filling volume of m$^3$, a satisfactorily high adsorption-medium function and a satisfactorily high passing speed are obtained. The maximum surface area per volume of the moldings is limited only in regard to the production techniques thereof and is not at all limited in regard to the capability of the absorbent substrates and the passing speed.

When the adsorbent substrate is made of fiber, the void is preferably from 70% to 95%, and the diameter of the fibers is preferably from 0.05 mm to 0.5 mm with regard to both a net plate and spherical fillers. This type of adsorbent substrate can be regenerated and reused very easily.

Either inorganic material such as ceramics or organic material such as plastics is capable of being a good substrate.

Inorganic material is, however, generally inferior in formability to organic material, and, in addition, inorganic material is more expensive. Organic material is, therefore, preferred provided that it is acid-resistant and is heat-resistant at a temperature of from 90° C. to 100° C. Moldings or fibers are made of a polyvinyl chloride, a polyester, a polyacrylonitrile, a polypropylene, a polyamide, etc. Such moldings and fibers are cheap and have a good adsorption capability irrespective of their polarity.

According to a preferred embodiment of the present invention, the waste liquor of pickling is heated to and held at a temperature of 60° C. to 100° C. for 1 hour or more prior to passing it through the adsorption bed. If the waste liquor is held at a temperature of from 60° C. to 100° C., the adsorption efficiency in terms of the adsorption amount per unit time is increased because, during the heating period, the small particles of the poly-silicic acid coagulate or adhere to colloidal particles to form large particles which have more of a collision frequency and thus are more suitable for adsorption on the substrates than are small particles.

The colloidal particles have a large surface area and are porous and hydrophilic. Therefore, they are easily adsorbed on the surface of a hydrophilic solid, such as metal, metal oxide, polar organic material, etc. As a result of adsorption, the colloidal silicic acid is stabilized. On the other hand, the surface of a hydrophobic solid, such as a nonpolar organic material, on which the colloidal silicic acid may be adsorbed is changed to a hydrophilic surface by a coexisting amphiphatic compound. That is, the hydrophobic surface is promptly converted to a hydrophilic surface due to the amphiphatic compound which has both a hydrophilic group and a hydrophobic group. Then the adsorbed colloidal particles form a layer which provides a suitable site for the adsorption or polymerization of the colloidal or polymeric silicic acid existing in the liquor. Thus, according to a preferred embodiment of the present invention, an amphiphatic compound is added to the waste liquor prior to the passage thereof through the adsorption bed.

An amphiphatic compound existing in the waste liquor enhances the capability of the adsorbent substrate. An organic compound is added to the pickling solution during the pickling process so as to inhibit excessive pickling, and this organic compound and its decomposition product act as an amphiphatic compound to convert the hydrophobic surface of the adsorbent substrates to a hydrophilic surface. If, however, this amphiphatic compound is added to the waste liquor subsequent to the pickling step and prior to the passage of the waste liquor through the adsorption bed, it can more effectively convert the hydrophobic surface of the adsorbent substrates to a hydrophilic surface. Hence, the adsorption amount of colloidal silicic acid can be increased. The amphiphatic compound to be incorporated is not restricted at all but is preferably an organic high-molecular compound since it is effective not only for converting the surface property but also for coagulating the colloidal silicic acid. The organic high-molecular compound used as the amphiphatic compound is preferably one which has a metacrylate ester, polyacrylamide, imidazoline, epoxy-amine, polyethylene-imine, polyethylene oxide, or sodium polyacrylate base or the like. The addition amount of the amphiphatic compound is preferably such that the concentration of the amphiphatic compound in the liquor is from 10 ppm to 100 ppm.

The adsorbent substrates can be easily regenerated by spraying water onto them either by leaving them within the cylindrical vessel or withdrawing them therefrom. The adsorption capability of the regenerated adsorbent substrates is not decreased as compared with that of new adsorbent substrates.

BRIEF DESCRIPTION OF THE DRAWING

The drawing is a vertical sectional diagram of part of an installation for removing the silicic compound from the waste liquor of steel pickling according to the present invention.

The cylindrical vessel 1, which is acid-resistant, is filled with the adsorbent substrates 3. The waste liquor of steel pickling is poured into the supplying conduits and pours out of the outlet port 4. The symbol "H"

Figure 1:
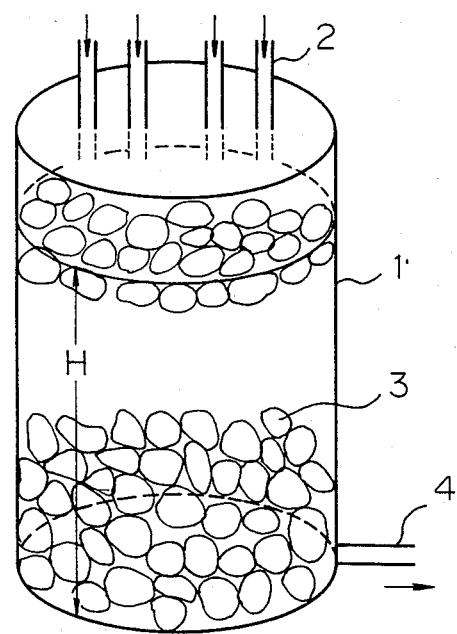

denotes the height of the adsorption bed, which is a heap of the adsorbent substrates 3.

The installation described above is used as follows for processing the waste liquor of steel pickling.

The waste liquor which results from the pickling of a continuously-annealed steel strip or steel wire or from the pickling of a batch-annealed steel sheet or steel wire is poured into and passes through the adsorption bed consisting of the adsorbent substrates 3.

Voids between the adsorbent substrates 3 are essentially uniformly distributed as seen in the flowing direction of the waste liquor, and the adsorption occurs in an optional part of the adsorption bed during the flow of the liquor through the voids.

The waste liquor contains 150 g of dissolved iron and 25 mg of silicic compounds as silicon per liter. When the above-described passing is continuously carried out for three months or longer, the layer of adsorbed silicic compounds grows to such an extent that the passing speed of the waste liquor appreciably decreases. The adsorbed silicic compounds form a layer on the adsorbent substrates 3. The adsorbent substrates 3 are detached from the cylindrical vessel and are regenerated by spraying water onto them in order to wash out the adsorbed silicic compounds. The regenerated adsorbent substrates 3 are again used for adsorption. Incidentally, the installation described above can be used not only for a continuous process but also for an intermittent process. Usually, the silicic compounds are continuously removed for two or three months and then periodic maintenance and regeneration of the adsorbent substrates 3 is carried out.

As will be understood from the foregoing description, the present invention is characterized by the removal of the colloidal silicic compounds by adsorption on the adsorbent substrates and attains long-term processing of a large amount of the waste liquor of steel pickling and further attains easy regeneration and reuse of the adsorbent substrates. Since the method according to the present invention can be easily carried out at a low cost, it can be carried out on an industrial scale.

The present invention is further explained by way of Examples.

EXAMPLE 1

A 60 cm-in-diameter cylindrical vessel made of glass fiber-reinforced plastic was filled with plastic moldings to a height of 50 cm. The moldings, which had a surface area of 250 $m^2$ per filling volume of $m^3$, were made of polyvinyl chloride. The waste liquor of steel pickling, containing 150 g of dissolved iron and 25 mg of silicic compounds as silicon per liter, was poured into the cylindrical vessel and passed through the adsorption bed. The concentration of the silicic compounds as silicon in the waste liquor was 5.5 mg/l after the passage. The waste liquor was then thermally decomposed by a known method into iron oxide powder and hydrogen chloride. The silicon dioxide ($SiO_2$) concentration in the iron oxide powder was then 55 ppm.

EXAMPLE 2

The procedure of Example 1 was repeated except that the waste liquor of steel pickling was heated to and held at 90° C. for 5 hours. The concentration of the silicic compounds as silicon in the waste liquor was 5.0 mg/l after the passage of the liquor through the adsorption bed. The concentration of the silicon dioxide in the iron oxide powder was then 55 ppm.

EXAMPLE 3

The procedure of Example 1 was repeated except that, prior to the pouring of the waste liquor, dimethylaminoethylmethacrylate was added to the waste liquor to a concentration of 20 ppm by stirring, stirring being continued for 5 hours. The concentration of the silicic compounds as silicon in the waste liquor was 4.5 mg/l, and the silicon dioxide concentration in the iron oxide powder was 45 ppm after the passage.

EXAMPLE 4

The procedure of Example 1 was repeated except that the net plate was made from polyethylene fibers having a diameter of 0.1 mm, and net plates were packed into the cylindrical vessel to form an adsorption bed having a porosity of 85%. The concentration of the silicic compounds as silicon in the waste liquor was 5.5 mg/l after the passing of the liquor through the adsorption bed, and the silicon dioxide concentration in the iron oxide powder was 55 ppm.

EXAMPLE 5

The procedure of Example 1 was repeated except that moldings having a surface area of 300 $m^2$ per filling volume of $m^3$ and made of alumina ceramics were filled into the cylindrical vessel. The concentration of the silicic compounds as silicon in the waste liquor was 5.5 mg/l after the passing of the liquor through the adsorption bed, and the silicon dioxide concentration in the iron oxide powder was 55 ppm.

EXAMPLE 6

As in the procedure of Example 1, the pouring of and the passing of the waste liquor was continued for approximately seventy days and then the adsorbent substrates were removed from the vessel. After the passing of the waste liquor for about seventy days, the adsorbent substrates were detached from the vessel. High-pressure water was sprayed onto the adsorbent substrates for approximately 30 minutes so as to wash out the adsorbed silicic compounds. The end of the regeneration of the substrates was easily detected with the naked eye.

EXAMPLE 7

An installation having the structure shown in the drawing was used to remove the silicic compounds from the waste liquor resulting from the pickling of a continuously-annealed steel strip and steel wire, as well as a batch-annealed steel sheet and steel wire. A 1.5 m-in-diameter cylindrical vessel was used in the installation. Moldings having a surface area of 250 $m^2$ per filling volume of $m^3$ were made of polyvinyl chloride and were packed into the vessel 1 to form a 1.7 m-thick adsorption bed. The waste liquor of steel pickling, containing 150 g of dissolved iron and 25 mg of silicic compounds as silicon per liter, was poured into the cylindrical vessel and was continuously passed through the adsorption bed at a linear velocity of from 1.5 m/hr to 2.0 m/hr for a period of three months. The total amount of processed waste liquor was 6500 $m^3$. The concentration of the silicic compounds as silicon in the waste liquor was 5–6 ppm after the passage of the liquor through the adsorption bed. The waste liquor was then thermally decomposed by a known method into iron oxide powder and hydrogen chloride. The silicon dioxide concentration in the iron oxide powder was from 50 ppm to 60 ppm.

After the three-month continuous removal of the silicic compounds, the passing speed of the waste liquor was decreased to 1 m/hr or less. The adsorbent substrates 3 were detached from the vessel 1, and 5 m$^3$ of high-pressure water was sprayed onto the adsorbent substrates 3 for approximately one hour. The adsorbent substrates 3 could be regenerated and reused for the processing of the waste liquor in the same manner as described above. In a six-month period, 13000 m$^3$ of the waste liquor was processed.

COMPARATIVE EXAMPLE 1

A commercially available biscuit cylinder having fine pores from approximately 12 μm to 15 μm in size was prepared and used as a filter, and the waste liquor of steel pickling, containing 150 g of dissolved iron and 25 mg of silicic compounds as silicon per liter, was poured into the cylinder. The waste liquor passed outside the biscuit cylinder via the cylinder's pores. The average concentration of the silicic compounds as silicon was 13 mg/l after the passing of the liquor through the biscuit cylinder. After pouring for five days, the passing of the waste liquor through the biscuit cylinder became difficult due to clogging, and, thus, the cylinder was inadequate for filtering.

I claim:

1. A method for removing a colloidal suspension of a silicic compound from a waste liquor which results from steel pickling, characterized in that said waste liquor is passed through an adsorption bed consisting of filled adsorbent substrates so that the silicic colloid is adsorbed on the adsorbent substrates, and, further, the adsorption is initiated at the top of the adsorption bed and is continued during the waste liquor's passage through the adsorption bed until the waste liquor arrives at an essentially bottom part of the adsorption bed.

2. A method according to claim 1, wherein voids between the adsorbent substrates are substantially uniformly distributed as seen in the flowing direction of the waste liquor.

3. A method according to claim 1, wherein said adsorbent substrates have a surface area sufficient to provide adsorption sites on which the silicic compound particles are adsorbed and have a passage cross section sufficient to provide a suitable passing speed of the waste liquor, thereby removing the silicic compounds without clogging occurring for a two-month period or longer.

4. A method according to claim 1, wherein the waste liquor is heated to and held at a temperature of from 60° C. to 100° C. for 1 hour or more prior to the passing thereof through the adsorption bed.

5. A method according to claim 1, wherein an amphiphatic compound is added to the waste liquor prior to the passage thereof through the adsorption bed.

6. A method according to claim 1, further comprising the step of regenerating the adsorbent substrates by spraying water on the adsorbent substrates.

7. A method according to claim 1, wherein said adsorbent substrates consist of moldings, a net plate made of fiber, or spherical fillers made of fiber.

* * * * *